L. W. GATES AND J. T. ALLMAND.
WINDOW STEADYING DEVICE.
APPLICATION FILED OCT. 14, 1918.

1,311,162.

Patented July 29, 1919.

UNITED STATES PATENT OFFICE.

LOUIS W. GATES AND JOHN T. ALLMAND, OF DETROIT, MICHIGAN, ASSIGNORS TO TERNSTEDT MANUFACTURING COMPANY, OF DETROIT, MICHIGAN, A CORPORATION OF MICHIGAN.

WINDOW-STEADYING DEVICE.

1,311,162.      Specification of Letters Patent.      Patented July 29, 1919.

Application filed October 14, 1918. Serial No. 257,926.

*To all whom it may concern:*

Be it known that we, LOUIS W. GATES and JOHN T. ALLMAND, citizens of the United States, residing at Detroit, county of Wayne, State of Michigan, have invented a new and useful Improvement in Window-Steadying Devices, of which the following is a specification.

This invention relates to anti-rattlers and especially to window-steadying devices adapted for use on automobile closed bodies. It has already been proposed to provide a window-steadying device in automobile closed bodies. The improvement hereinafter described is intended to do the same work but is much more sightly in appearance and easier to apply. The specific device would also be useful in many other connections as an anti-rattler.

In the drawings,—

Figure 1:
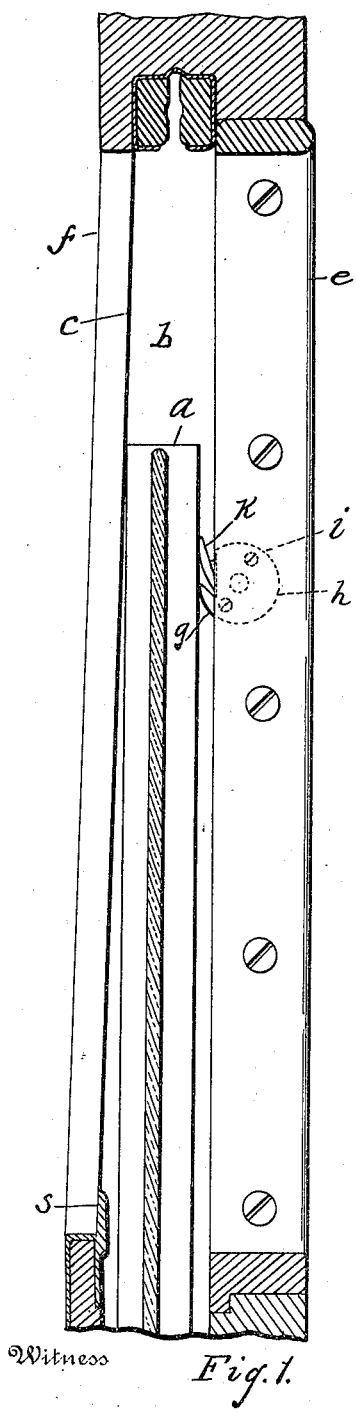
Figure 1 is a vertical section of the window frame of an automobile closed body.
Figure 2:
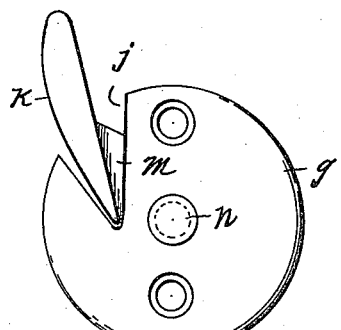
Fig. 2 is an elevation of the device.
Figure 3:
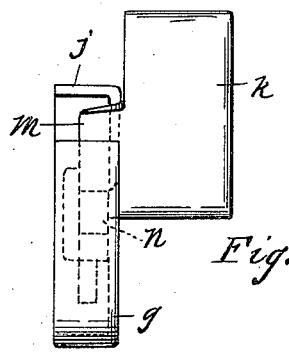
Fig. 3 is an elevation of the same device taken from the left of Fig. 2.
Figure 4:
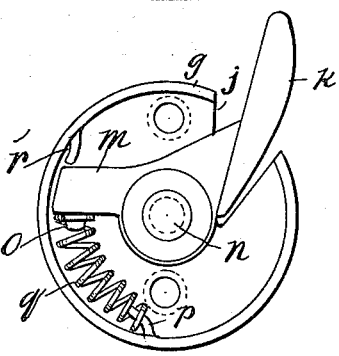
Fig. 4 is a view of the reverse side of the device to that shown in Fig. 2.

*a* designates the felted window sash which is now in common use in automobile body construction. *b* is the window-way formed by the shoulder *c* and the molding *e* screwed to the window post *f*.

The improved piece of hardware consists simply of a circular flanged plate *g* which can be fastened into a circular mortise *h* of the window post by screws *i*. The housing is provided with a V slot *j* through which protrudes the arm that carries the shoe *k* which is highly polished and which bears against the side of the window sash. The shoe is simply an integral part of a piece of metal which is a single stamping cut and twisted to form the shoe *k* and the arm *m* with the offset, the arm being riveted to the center of the housing at *n* so that the arm may rotate upon the rivet. A projection *o* on the tail of the arm in conjunction with the struck out lip *p* of the flange of the housing serves to form the seats for the coiled spring *q*. *r* is a stop for the tail of the arm to limit the outward projection of the shoe.

The common construction of automobile closed bodies now includes a window well into which the window withdraws and a window fence *s*. This involves a windowway which is narrower at the top than at the bottom. Consequently the window sash cannot be made to fit this tapering windowway and although the window may be made reasonably tight when it is completely closed if the proper precautions are taken, when the window is partially raised it is bound to be loose at the top in the window way unless some window-steadying device is provided. It is the purpose of this invention to provide such a device.

The window post may be mortised in the easiest possible fashion for this device inasmuch as it may be bored. The housing may then be seated in the mortise and the device screwed to the post, the window molding *e* may then be applied, and the device is almost completely concealed. Even the shoe does not protrude beyond the molding but is almost concealed behind the molding in the window-way. The consequence is there is no objection to the device as unsightly. The shoe is highly nickel-plated and polished so that the friction of the felted sash upon it is small.

What we claim is:

1. An anti-rattler, comprising a countersinkable housing, an arm pivoted therein and provided with an offset bearing member swingable in a plane parallel to the face of the member to which the housing is attached, and a spring yieldingly resisting rotation of the arm carrying the bearing member.

2. An anti-rattler, comprising a housing in the form of a circular flanged plate having a slot in its face, an arm pivoted to the plate and protruding through the slot, a shoe on the end of the arm adapted to swing across and in the plane of the circular face of the plate, for bearing against the side of the window sash, and a spring engaged at one end against the arm and at the other end against the flange of the housing.

3. An anti-rattler, comprising a circular flanged plate provided with a slot in its face, an arm rotatably mounted on the plate and having a portion protruding through the slot, and a shoe portion carried on the said arm, the flange having a pair of projections struck out, one forming a stop for the arm and the other a spring seat and the said arm provided with a projection forming a spring seat, and a coiled spring seated upon the projection of the arm and one of the projections of the annular flange.

4. In combination with a vehicle body provided with a window-way, a window sash slidable therein, and a window-steadying device comprising a housing sunk into the face of the window post, a member offset therefrom to bear against the inside of the sash to press the sash against the outside wall of the way, and means in the housing for yieldingly projecting the said member against the side of the sash.

5. An anti-rattler, having in combination, a housing for attachment to the face of a post, an arm movable therein, a spring for resisting such movement, and a shoe on the said arm but offset therefrom to function across the face of said housing in a plane parallel therewith.

6. The combination with a window construction having a window post forming part of a window-way, and a molding adapted to complete the window-way, and a sash slidable in said way, of a window-steadying device comprising an offset part that is adapted to bear against the inside of the sash and force the sash against the outside wall of the way, and means sunk in the face of the window post and under the molding for yieldingly forcing the said offset member against the inside of the sash.

7. The combination with a window frame construction having a post forming a part of a window-way, a removable molding for completing the window-way, a sash slidable in said window-way, and a window-steadying device comprising a housing, a spring, an arm engaged by the spring and terminating in an offset contact member for engaging the inside of the window sash, the said housing and the parts included therein being sunk in the face of the window posts and under the molding.

In witness whereof we have hereunto set our hands on the 10th day of October, 1918.

LOUIS W. GATES.
JOHN T. ALLMAND.